May 30, 1967
H. K. WONG ETAL
3,322,601
MACHINE FOR PRODUCING LIGHT POLARIZING PANELS AND METHOD
Filed Aug. 31, 1962
2 Sheets-Sheet 1
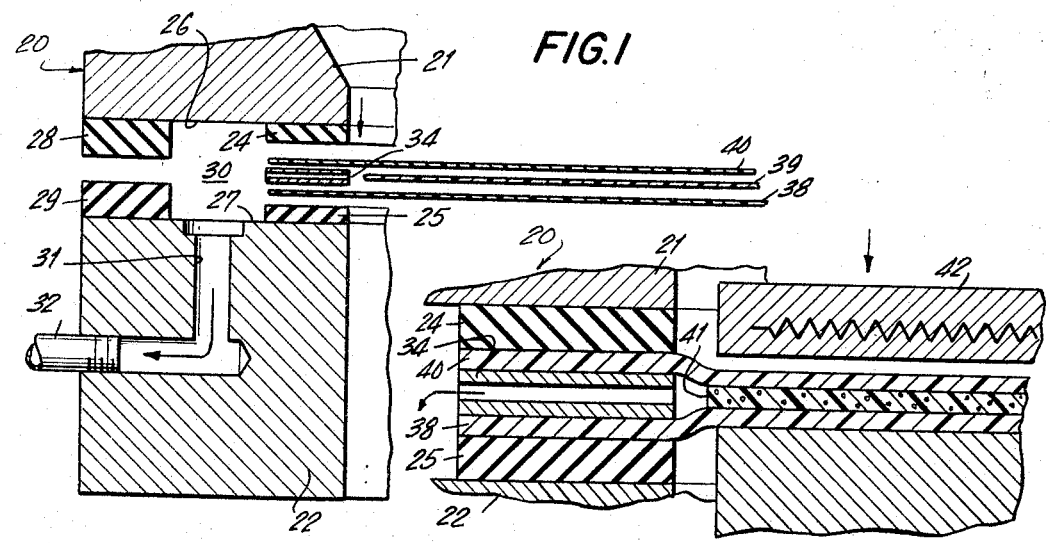
FIG.1
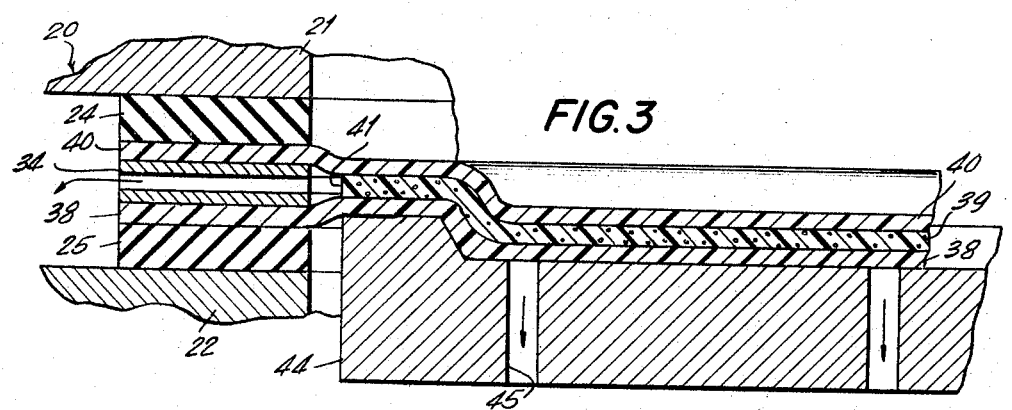
FIG.2
FIG.3
FIG.4
FIG.5
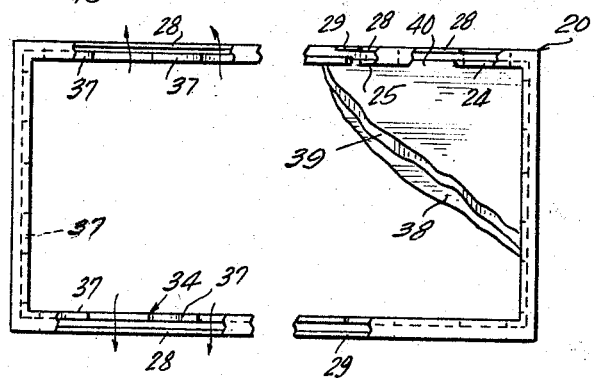
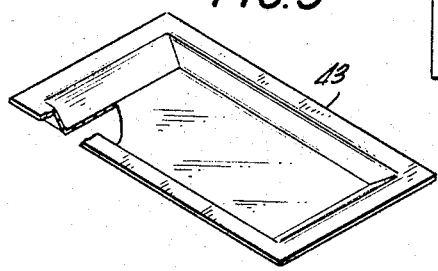
INVENTORS
HERBERT K. WONG
JOHN G. YEE
BY
Albert F. Kronman
ATTORNEY

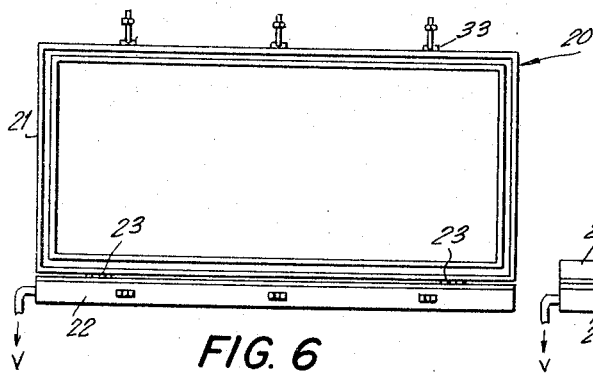
FIG. 7
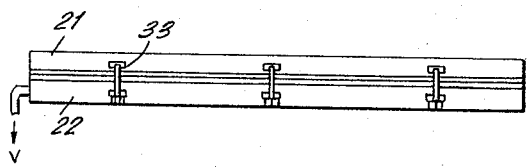
FIG. 6
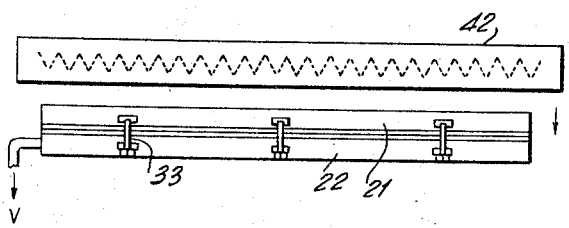
FIG. 8
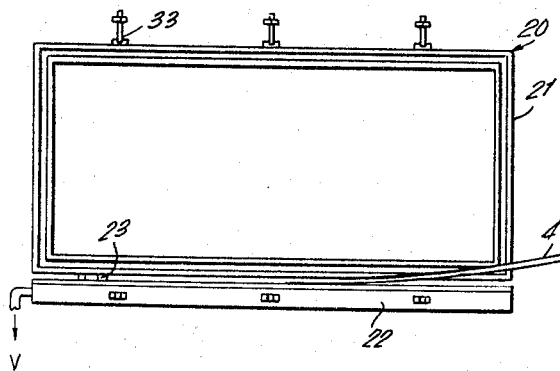
FIG. 9
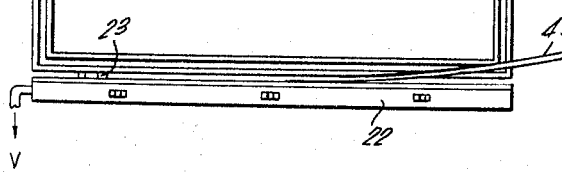
FIG. 11
FIG. 10
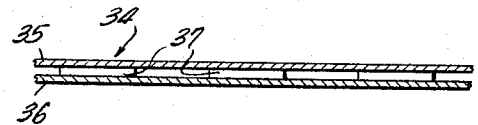
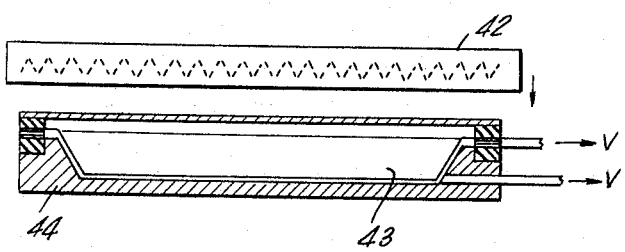
INVENTORS
HERBERT K. WONG
JOHN G. YEE
BY
ATTORNEY United States Patent Office 3,322,601
Patented May 30, 1967

3,322,601
MACHINE FOR PRODUCING LIGHT POLARIZING PANELS AND METHOD
Herbert K. Wong and John G. Yee, San Francisco, Calif., assignors to Polarized Panel Corporation, Sherman Oaks, Calif., a corporation of Delaware
Filed Aug. 31, 1962, Ser. No. 220,834
5 Claims. (Cl. 156—499)

This invention relates to apparatus for manufacturing light polarizing panels and the method of said manufacture.

In the manufacture of light polarizing panels such as are used to provide radially polarized light for illuminating purposes, it is desirable to construct a panel having a minimum thickness and producing a maximum amount of polarized light. Such panels are normally manufactured from a plurality of layers of light transmitting material which layers contain material of alternately different indecies of refraction. In use the laminated structures are subjected to ambient conditions of heating and cooling which often result in wrinkling of the individual layers whereupon the light polarizing panels lose their attractive appearance. In addition, it is extremely difficult to provide a light polarizing panel employing a plurality of the thin layers of material which will have a uniform appearance because of the natural tendency of the layers to separate and wrinkle.

Accordingly it is an object of the present invention to provide a light polarizing panel or the like in which the multi-layered construction will have a uniform, attractive appearance.

Another object of the present invention is to a provide a light polarizing panel in which the surfaces of the layers will be disposed in substantially parallel orientation.

Still another object of the present invention is to provide a device for forming light polarizing panels which is capable of producing the panels in large quantities and without internal strain or irregularities.

Another object of the present invention is to provide a method for handling a plurality of sheets of unbroken large area whereby air may be substantially excluded from the interior of the assembly in order to produce a uniform product.

A feature of the present invention is its use of a novel frame arrangement for holding the light polarizing and other layers of the product during manufacture so that they can be subjected to heat and vacuum in order to produce a finished product.

A further feature of the present invention is its means for drawing air out of a multi-layered assembly of sheets from the periphery of the sheets so that large area, substantially air free panels can be produced.

Still another feature of the present invention is its use of heat to laminate the sheets while they are held together by atmospheric pressure.

Another feature of the present invention is its use of vacuum forming means for the multi-layer assembly while the assembly is subject to internal vacuum and external atmospheric pressure.

The invention consists of the construction, combination and arrangement of parts, as herein illustrated, described and claimed, and in which:

FIG. 1 is a fragmentary cross sectional somewhat exploded view of a light polarizing panel forming frame made in accordance with the present invention.

FIG. 2 is a somewhat enlarged fragmentary view in cross section illustrating the manner in which the multilayered light polarizing structure is held under vacuum while heat is applied to the surface thereof.

FIG. 3 is a view similar to FIG. 2, showing the vacuum forming of the multi-layered structure.

FIG. 4 is a top plan view reduced in size and partially broken away of the entire frame for forming light polarizing panels showing the manner in which air is evacuated from between the multi-layered structure.

FIG. 5 is a somewhat isometric view greatly reduced in size of a light polarizing panel made in accordance with the present invention.

FIG. 6 is a somewhat diagrammatic view of the first step in the manufacture of a light polarizing panel according to the present invention.

FIG. 7 is a view similar to FIG. 6 showing the second step of manufacture.

FIG. 8 is a view similar to FIGURES 6 and 7 showing the third step of manufacture.

FIG. 9 is a view similar to FIGURES 6, 7, and 8 showing the final step in the manufacture of a light polarizing panel according to the present invention.

FIG. 10 is a somewhat diagrammatic view partly in cross section showing the steps of vacuum forming a light polarizing panel during the laminating process.

FIG. 11 is a fragmentary view in longitudinal section of the vacuum bar shown in FIGURES 1, 2, and 3.

Referring to the drawings and particularly FIGURES 1 thru 3 and 6 thru 9, 20 indicates a frame made up of a top frame member 21 and a bottom frame member 22. These frame members 21, 22 are secured together by hinges 23 best shown in FIG. 6. The frames 21, 22 are preferably made of rigid material as for example metal strips. Gaskets 24, 25 are secured to the inner surfaces 26, 27 of the frame members 21, 22 where the said frame members would normally come into contact with each other when in the closed position. The gaskets 24, 25 are made of some suitable resilient material such as rubber, Neoprene or the like.

A second, outer set of gaskets 28, 29 are secured to the frame surfaces 26, 27 respectively and are spaced from the first pair of gaskets 24, 25 as shown in FIG. 1. The spaced gaskets 24, 25, 28, 29 define an elongated channel area indicated at 30 in FIG. 1 and hereinafter referred to as the vacuum chamber. The bottom frame 22, is suitably bored as indicated at 31 to provide a path whereby a source of vacuum (not shown) can be connected, to the vacuum chamber 30 by means of a conduit 32.

The frame 20 is provided with clamping means indicated at 33 in FIGURES 6, 7, and 8 so that the top frame 21 can be secured to the bottom frame member 22 with sufficient clamping force to bring the opposed gaskets 24, 25, 28, 29 into air-tight contact with each other. The clamping means 33 may consist of lugs and bolts as shown, cams, or other devices well known in the clamping art.

A vacuum bar 34 shown in detail in FIG. 11 and in cross section in FIGURES 1 thru 3, completes the assembly of frame members. The vacuum bar 34 consists of an elongated flattened top strip 35 a complementary elongated flattened bottom strip 36 and a plurality of spaced shims 37 disposed between the top and bottom strips 35, 36. The shims 37 provide passages between the strips 35, 36 so that air may be drawn therethrough in the manner hereinafter more fully set forth.

The light polarizing panel according to the present invention consists of a bottom sheet of transparent or translucent material made of styrene, vinyl or the like. The bottom sheet indicated at 38 in FIGURES 1 thru 3 forms a support for a layer of light polarizing material 39 which consists of one or more sheets of a cellular plastic material in the nature of a foamed plastic sheet containing a large number of entrapped bubbles. The foamed plastic is made of substantially light transparent plastic material extruded in the form of a thin flat sheet. The bubbles within the cellular structure are flattened until the top and bottom of each of the bubbles are substantially parallel and lie in the plane of the sheet. This structure will transmit light, incident thereon, as polarized light and behave as a radial polarizer by reason of the fact that the incident light is refracted and reflected in its passage through the foamed plastic sheet. The plastic material may be polystyrene, a cellulose ester, methyl methacrylate, or the like.

A transparent or translucent top sheet 40 is laid over the light polarizing layer 39 as shown in FIGURES 1 thru 3. The top sheet 40 is preferably thinner than the bottom sheet 38 and may be made of vinyl, styrene or any suitable transparent or translucent material. When placed within the frame 20 the bottom sheet is separated from the top sheet 40 by the vacuum bar 34 and the edges 41 of the light polarizing layer are spaced inwardly of the vacuum bar 34.

When the frame 20 is brought together and locked by means of the clamping device 33 the assembly will assume the position shown in FIG. 2. It will be apparent that air can pass from the interior of the panel sheets 38, 39, 40 through the openings in the vacuum bar 34 and into the vacuum chamber 30. The air can then be pumped out of the vacuum chamber by way of the bore 31 and conduit 32.

The various steps in the manufacture of a light polarizing panel according to the present invention will be apparent by reference to FIGURES 6 through 9.

The frame 20 is opened and the various layers consisting of the bottom sheet 38, light polarizing layer 39, and top sheet 40 are laid upon the bottom frame 22. The vacuum bar 34 is interposed between the bottom sheet 38 and top sheet 40 during this step.

The top frame member 21 is brought down upon the assembled sheets as shown in FIG. 7 and secured to the bottom frame member by tightening the clamping means 33. A source of vacuum (not shown) indicated by the arrow in FIG. 7 is connected to the conduit 32 and the air pumped out of the assembly through the vacuum chamber 30. A vacuum of the order of 10 to 15 inches of mercury has been found satisfactory for this purpose. When substantially all of the air has been pumped out of the assembled sheets the material is ready for the next, or heating step.

As shown in FIG. 4 the vacuum bar 34 extends around the entire frame 20 and provides openings between the shims 37 whereby air can be drawn out of the assembled sheets from around the entire periphery of the light polarizing layer 39. In this manner, it is possible to fabricate sheets of large area so that there are no large air bubbles remaining within the assembled sheets when the panel is finished. It will be understood that should large air bubbles be entrapped within the assembled sheets they would seriously interfere with the light polarizing and acceptable appearance requirements of the panel.

With the assembly still under vacuum the frame is heated as by placing it beneath the oven indicated diagrammatically at 42 in FIGURES 2 and 8. The oven 42 applies heat to the top surface of the sheets 38, 39, 40, which heat is conducted through the assembly until the entire panel structure is heated. The amount of heat and the period during which it is to be applied to the assembled sheets will vary depending upon the nature and thickness of the sheets. However, it has been found that temperatures of 200 to 300° F. and a period of from 1 to 4 minutes will suffice to form the sheets into a suitable panel.

When the heat is first applied the plastic softens and begins to stretch. Large gas filled bubbles are formed which are quickly pumped out by the vacuum source. Thereafter, as the heating continues the plastic reaches a critical temperature at which it begins to shrink. The edges of the sheets 38, 40 are held tightly between the gaskets 24, 25 with the result that the sheets 38, 40 become taut and are forced into contact with the polarizing layer 39 by atmospheric pressure as shown in FIG. 2. The heating further serves to relax internal stresses which are normally set up during the manufacture of the sheets and which would be objectionable in a finished light polarizing panel. The atmospheric pressure bearing against the top and bottom sheets 38, 40 also further flattens the bubbles within the foamed plastic material forming the light polarizing layer 39. The further flattening of the bubbles improves the polarizing properties of the layer 39. In addition, the interfaces between the bottom sheet 38, the top sheet 40 and the light polarizing layer or layers 39 add polarizing efficiency to the finished article. The entire assembly of sheets becomes laminated by reason of the application of heat and pressure and the continued application of the vacuum removes substantially all of the air from between the said sheets.

The frame 20 is next removed from the oven 42 and opened, after it has been allowed to cool to room temperature. The light polarizing panel 43 may then be removed from the frame as shown in FIG. 9.

Where it is desired to form the light polarizer into a decorative panel such as the pan shown in FIG. 5 the frame 20 is placed over a mold 44 (see FIGURES 3 and 10). The mold 44 is disposed against the bottom surface of the sheet 38 and is provided with bores 45 which communicate with the interior of the mold 44. The bores 45 are connected to a source of vacuum indicated by the arrow and letter V in FIG. 10. After the sheets 38, 39, 40 have been softened in the manner hereinabove set forth the vacuum source, connected to the mold 44, is applied and the panel 43 pulled down into the mold 44 in accordance with the well known vacuum forming practices. The assembly is allowed to cool to room temperature and may then be removed from the mold whereupon it will have the desired rigid configuration.

From the foregoing it will be seen that there has been provided a machine and process for the manufacture of light polarizing panels capable of handling a plurality of thin sheets of plastic material to produce large area strain-free structures. The finished panels, moreover, are flat and free from entrapped bubbles of air. Although relatively thin in cross section they can be moulded into shapes which impart structural characteristics so that they are self supporting.

Having thus fully described the invention what is claimed as new and desired to be secured by Letters Patent of the United States, is:

1. A machine for laminating a light transmitting top sheet, a light transmitting bottom sheet and an intermediate light polarizing member into a light polarizing panel comprising in combination a top frame member, a bottom frame member, spaced inner and outer gasket means carried by said top and bottom frame members to form a substantially air tight enclosure between the frame and members, an elongated bar disposed between the top and bottom sheets and received between the inner gasket means, a plurality of transverse bores in the said bar connecting the space between the top and bottom sheets and the space between the inner and outer gaskets, means to apply a vacuum source to the frame to substantially remove the air from between the sheets and light polarizing member, and means to apply heat to the assembly while subjected to vacuum to form a laminated light polarizing panel.

2. A machine for laminating a light transmitting top sheet, a light transmitting bottom sheet and an intermediate light polarizing member into a light polarizing panel comprising in combination a top frame member, a bottom frame member, hinges interconnecting the frame members along one side thereof, spaced inner and outer gasket means carried by said top and bottom frame members to form a substantially air tight enclosure between the frame and members, clamping means carried by the frame members to hold the frames together and the gasket means in air tight contact with each other, an elongated bar disposed between the top and bottom sheets and received between the inner gasket means, a plurality of transverse bores in the said bar connecting the space between the top and bottom sheets and the space between the inner and outer gaskets, means to apply a vacuum source to the frame to substantially remove the air from between the sheets and light polarizing member, and means to apply heat to the assembly while subjected to vacuum to form a laminated light polarizing panel.

3. A machine for laminating a light transmitting top sheet, a light transmitting bottom sheet and an intermediate light polarizing member into a light polarizing panel comprising in combination a top frame member, a bottom frame member, spaced inner and outer gasket means carried by said top and bottom frame members to form a substantially air tight enclosure between the frame and members, an elongated bar disposed adjacent the pheripheral edge of and between the top and bottom sheets and received between the inner gasket means, a plurality of transverse bores in the said bar connecting the space between the top and bottom sheets along substantially the entire periphery of the said sheets, and the space between the inner and outer gaskets, means to apply a vacuum source to the frame to substantially remove the air from between the sheets and light polarizing member, and means to apply heat to the assembly while subjected to vacuum to form a laminated light polarizing panel.

4. A machine according to claim 1 in which the elongated bar consists of a flat top member, a flat bottom member and a plurality of spaced shims disposed between the top and bottom members to provide air passages therebetween.

5. A machine for laminating a light transmitting top sheet, a light transmitting bottom sheet and an intermediate light polarizing member into a light polarizing panel comprising in combination a top frame member, a bottom frame member, hinges interconnecting the frame members along one side thereof, spaced inner and outer gasket means carried by said top and bottom frame members to form a substantially air tight enclosure between the frame and members, clamping means carried by the frame members to hold the frames together and the gasket means in air tight contact with each other, an elongated bar disposed between the top and bottom sheets and received between the inner gasket means, a plurality of transverse bores in the said bar connecting the space between the top and bottom sheets and the space between the inner and outer gaskets, means to apply a vacuum source to the frame to substantially remove the air from between the sheets and light polarizing member, vacuum forming means disposed beneath the clamped sheet assembly, and means to apply heat to the assembly while subjected to vacuum form a laminated light polarizing panel.

References Cited
UNITED STATES PATENTS

| | | | |
|---|---|---|---|
| 2,762,736 | 9/1956 | Beuglet | 156—286 |
| 2,781,078 | 2/1957 | Dovidio | 156—382 |
| 2,783,176 | 2/1957 | Boicey | 156—286 |
| 3,032,464 | 5/1962 | Grieve | 156—382 |

EARL M. BERGERT, *Primary Examiner.*

W. J. VANBALEN, *Assistant Examiner.*